Patented Sept. 11, 1951

2,567,651

UNITED STATES PATENT OFFICE 2,567,651

1,3-DIALKYL-6-AMINO-1,2,3,4-TETRAHYDRO-2,4-PYRIMIDINEDIONES

Viktor Papesch, Morton Grove, and Elmer F. Schroeder, Chicago, Ill., assignors to G. D. Searle & Co., Chicago, Ill., a corporation of Illinois No Drawing. Application January 11, 1950, Serial No. 138,074

11 Claims. (Cl. 260—260)

The present invention is concerned generally with substitute diketones of heterocyclic compounds, and more particularly with substitution products of 6-amino-1,2,3,4-tetrahydro-2,4-pyrimidinedione, and the production thereof. The compounds which comprise our invention have the following general structural formula

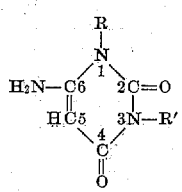

wherein the radicals R and R' represent a member of the group consisting of alkyl, cycloalkyl and aralkyl radicals and wherein one of the radicals R and R' contains a minimum of three carbon atoms.

Among the radicals which one of the substituents R and R' may represent are normal and branched chain propyl, butyl, amyl, hexyl and octyl radicals, cyclopropyl, cyclobutyl, cyclopentyl, cyclohexyl, benzyl, phenethyl and phenylpropyl radicals, the other substituent being a member of the same class, methyl or ethyl. The R and R' groups may be different or, in certain instances, identical.

The aminotetrahydropyrimidinediones of this invention have been found to possess useful therapeutic properties, particularly as cardiovascular, diuretic and chemotherapeutic agents.

The prior art discloses several 1,3-dialkyl-6-amino-1,2,3,4-tetrahydro-2,4-pyrimidinediones, in which the alkyl group represents methyl and ethyl radicals. However, these known compounds have not been shown to be therapeutically useful and experiments on the diuretic effects of these known compounds in dogs have shown them to be inefficacious, whereas the pyrimidinediones of this invention, due to the presence of a larger alkyl or aralkyl group, have shown an effectiveness of a much higher order, some of which are comparable even to the highly potent mercurials. The unusual usefulness of our compounds in comparison to the mercurials is based on two factors. The pyrimidinediones of our invention may be administered orally, while the mercurials must be injected. Further, while the usefulness of the mercurials is greatly limited by their toxicity, our compounds show a very low order of toxicity. These results obtained in diuretic tests in mammals have also been confirmed in the clinic.

The following examples illustrate methods by which these aminotetrahydropyrimidinediones may be prepared. One of our preferred methods for obtaining certain 1,3-dialkyl-6-amino-1,2,3,4-tetrahydro-2,4-pyrimidinediones begins with the treatment of 1,3-dialkyl derivatives of urea with acetic anhydride and cyanoacetic acid for 30–200 minutes at 50–100° C. We have discovered that in the case of unsymmetrically substituted 1,3-dialkyl ureas the addition of the cyanoacetyl group occurs primarily at the nitrogen atom to which the smaller alkyl group is attached. Thus, if R is a radical containing more carbon atoms than R', the addition occurs primarily as follows:

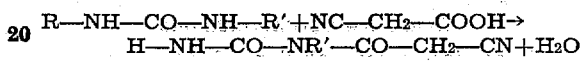

If the R and R' groups are very similar, a mixture of isomers will be formed. To effect the cyclization of the cyanoacetylurea derivatives we add sufficient alkali to bring the pH to 7 or higher and maintain the temperature at 40 to 100° C. for a few minutes.

In order to prepare the substituted 6-amino-1,2,3,4 - tetrahydro - 2,4 - pyrimidinedione derivatives substituted in the 3-position by a larger group than the substituent in the 1-position we prefer the following procedure. A monoalkyl urea is treated with acetic anhydride and cyanoacetic acid, with or without acetic acid, for 20 to 200 minutes at 50–100° C. to form the N-alkyl-N'-cyanoacetylurea. For the cyclization it is detrimental to the yield to use an excess of alkali. Instead, we prefer to use dilute alkali to make the solution barely alkaline. The reaction is thus completed in only a few minutes. The resultant 1 - alkyl - 6 - amino - 1,2,3,4 - tetrahydro - 2,4-pyrimidinediones are treated with slightly more alkali than necessary to form the alkali metal salt and then with an organic halide or sulfate. An organic solvent may be necessary to keep the alkylating agent in solution. We heat for 1–6 hours at 50–100° C. to effect the substitution.

The following examples illustrate in detail certain of the compounds which comprise this invention, and methods of producing them. The invention is not to be construed as limited in spirit or in scope thereby. It will be apparent to those skilled in the art that many modifications in materials and methods may be made without departing from our invention.

EXAMPLE 1

1-n-propyl-6-amino-1,2,3,4-tetrahydro-2,4-pyrimidinedione 173 g. of propyl urea are dissolved in 302 ml. of acetic anhydride at 70° C. Then 167 g. cyanoacetic acid are added and the solution is kept at 60° C. until crystallization begins, which usually takes about 1.5 to 2 hours. One liter of ether is added with stirring. After cooling one filters and rinses with ether. To the resultant 160 g. of N-propyl-N'-cyanoacetylurea one adds 135 ml. of 10% sodium hydroxide, stirs and heats to 85° C. for 15 minutes. After cooling the pH is adjusted to 5. The white precipitate is filtered and washed with water. 90 g. of the crude 1-n-propyl - 6 - amino-1,2,3,4-tetrahydro-2,4-pyrimidinedione is obtained. Recrystallization from 40% ethanol gives white crystals which melt at 273–275° C.

EXAMPLE 2

1-n-propyl-3-methyl-6-amino-1,2,3,4-tetrahydro-2,4-pyrimidinedione 65 g. of 1-n-propyl-6-amino-1,2,3,4-tetrahydro-2,4-pyrimidinedione are dissolved in 130 ml. of 10% sodium hydroxide. Operating at 60–70° C. with stirring one adds dropwise first 40 ml. of dimethyl sulfate, then 18 ml. of 10% sodium hydroxide and then again, dropwise, 10 ml. of additional dimethyl sulfate. Finally one neutralizes with 10% sodium hydroxide. On cooling, filtration and washing with water one obtains white crystals which, on recrystallization from water, melt at 165–167° C.

EXAMPLE 3

1-n-propyl-3-ethyl-6-amino-1,2,3,4-tetrahydro-2,4-pyrimidinedione

To an ice-cooled solution of 63 g. of ethyl isocyanate in 300 ml. of benzene are added, with stirring, a solution of 54.5 g. of n-propylamine in 200 ml. of benzene, the temperature of the reaction being held at about 15 to 25° C. After completion of the addition, the solvent is removed by vacuum distillation. The residual syrup crystallizes on cooling to give 114 g. of N-propyl-N'-ethylurea in practically pure form. On recrystallization from 10 parts of petroleum ether, needles melting at 79–80° C. are obtained.

A mixture of 97 g. of the crude N-propyl-N'-ethylurea, 76.5 g. of cyanoacetic acid and 190 ml. of acetic anhydride is heated at 70–80° C. The heat of reaction at the start may necessitate removal of the container from the bath until the main reaction is completed. The solvent is removed as completely as possible by vacuum distillation at 70–80° C. 150 ml. of water are added to the syrup and the solvent again distilled off as completely as possible. 201 g. of a syrup, consisting largely of N-n-propyl-N'-ethyl-N'-cyanoacetylurea is obtained.

100 g. of this crude syrup are stirred with 150 ml. of water at 20° C. and treated with 25 ml. of a 70% (by weight) aqueous solution of sodium hydroxide. The syrup dissolves completely, but almost immediately, a second, oily product is deposited. The temperature rises to 70–75° C., then drops again. On cooling and stirring, the oil rapidly crystallizes. Filtration, washing with water and air drying gives 66 g. of crude product. Two recrystallizations from hot ethyl acetate and air drying yield 47 g. of 1-propyl-3-ethyl-6- amino-1,2,3,4 - tetrahydro-2,4-pyrimidinedione monohydrate in the form of diamond-shaped plates, melting at 86–87° C. To obtain the anhydrous product one heats for 24 hours at 80° C. and recrystallizes from 10 parts of ethyl acetate. The fine white needles melt at 170–171° C.

EXAMPLE 4

1,3-dipropyl-6-amino-1,2,3,4-tetrahydro-2,4-pyrimidinedione 270 ml. of a cooled 70% sodium hydroxide solution are added to a solution of 300 g. of n-propylamine in 650 ml. of ice water in a 5-liter flask with mechanical stirring. A solution of 263 g. of phosgene in 1320 ml. of benzene, prepared at 20° C., is added to the reaction mixture with cooling at 0–5° C. in the course of two hours. Toward the end of the reaction, the temperature is permitted to rise to about 11° C. Stirring is continued for a half hour. The aqueous layer is separated and washed with benzene, the benzene solutions are united and dried over anhydrous sodium sulfate. The benzene is then distilled off.

372 g. of the resultant di-n-propylurea are dissolved in 335 ml. of glacial acetic acid and 745 ml. of acetic anhydride. Then 238 g. of cyanoacetic acid are added and the mixture kept at 60–65° C. for 2 hours. Most of the solvent is then distilled off at 80° C. and 10 mm. pressure. After addition of 200 ml. of water, the distillation is resumed. 550 ml. of a 10% sodium hydroxide solution are added to the residue with stirring and the pH adjusted to fairly strong alkalinity to phenolphthalein. The solution becomes hot and an oil is formed which on stirring and cooling crystallizes. The resultant monohydrate of 1,3-di-n-propyl-6-amino-1,2,3,4-tetrahydro-2,4-pyrimidinedione is recrystallized from 20% ethanol. The white crystals soften at 94° C. and melt at 98–100° C. By drying at 80° C. for 8 hours anhydrous crystals are obtained which melt at 136–138.5° C.

EXAMPLE 5

1-isopropyl-3-methyl-6-amino-1,2,3,4-tetrahydro-2,4-pyrimidinedione

A solution of 10 g. of methyl isocyanate in 50 ml. of benzene is cooled in ice and treated by the slow addition of an ice-cold solution of 15 g. of isopropylamine in 25 ml. of benzene. After completion of the addition, the benzene is removed by vacuum distillation. The residual syrup crystallizes on cooling to give 16 g. of practically pure N-isopropyl-N'-methylurea, melting at 92–94° C. On recrystallization from a mixture of 10 parts of ethyl acetate and 10 parts of ethyl ether, long needles melting at 94–96° C. are obtained.

A mixture of 25 g. of N-isopropyl-N'-methylurea, 22 g. of cyanoacetic acid and 50 ml. of acetic anhydride is heated for 2 hours at 70–80° C. in a water bath. The solvent is removed as completely as possible by vacuum distillation. 25 ml. of water is added to the residue and vacuum distillation completed. The crude syrup, consisting largely of N-isopropyl-N'-methyl-N'-cyanoacetylurea weighs 48 g.

27 g. of this syrup are treated with 20 ml. of 35% aqueous sodium hydroxide solution. The syrup completely dissolves and the temperature rises rapidly to about 75° C. Vigorous stirring is maintained for a few minutes until the temperature begins to drop. An oily product separates which, on further cooling and stirring, solidifies. Filtration, washing with water and air drying yield the crude 1-isopropyl-3-methyl-6-amino - 1,2,3,4 - tetrahydro - 2,4 - pyrimidinedione. After drying for 12 hours at 80° C., a melting point of 210-212° C. is obtained.

EXAMPLE 6

*1-isopropyl-3-ethyl-6-amino-1,2,3,4-tetrahydro-2,4-pyrimidinedione*

From 79 g. of ethyl isocyanate in 300 ml. of benzene and 82 g. of isopropylamine in 200 ml. of benzene one obtains, by using the procedure of Example 3, 134 g. of N-isopropyl-N'-ethylurea, which, on recrystallization from ethyl acetate, melts at 158-159° C. 91 g. of the crude product is reacted with 71 g. of cyanoacetic acid and 175 ml. of acetic anhydride as in Example 3 to obtain 160 g. of a syrup, consisting largely of N - isopropyl - N' - ethyl-N'-cyanoacetylurea. 100 g. of this syrup in 150 ml. of water are then reacted with 30 ml. of a 70% aqueous solution of sodium hydroxide. Proceeding as in Example 3 one obtains 64 g. of crude 1-isopropyl-3-ethyl-6 - amino - 1,2,3,4 - tetrahydro-2,4-pyrimidinedione, which on two recrystallizations from methanol and drying at 80° C. for 12 hours gives 27 g. of cubical prisms melting at 200-201° C., containing no water of crystallization.

EXAMPLE 7

*1-n-butyl-6-amino-1,2,3,4-tetrahydro-2,4-pyrimidinedione*

525 g. of n-butylurea are dissolved in 800 ml. of acetic anhydride with warming. 440 g. of cyanoacetic acid are added, and after 2 hours of heating at 60° C. one cools, adds 2 liters of ether, stirs, cools again, filters off the white precipitate and rinses with ether. To the resultant 546 g. of N-butyl-N'-cyanoacetylurea one adds 930 ml. of concentrated aqueous ammonia, dilutes with water to make a volume of 3000 ml., and keeps the mixture at 70° C. for 30 minutes. The cooled solution is acidified, filtered and the white crystals are washed with water. The yield is 170 g. of 1 - n - butyl - 6 - amino - 1,2,3,4-tetrahydro-2,4-pyrimidinedione, which on recrystallization from dilute alcohol melts at 266-267° C.

EXAMPLE 8

*1-n-butyl-3-methyl-6-amino-1,2,3,4-tetrahydro-2,4-pyrimidinedione*

250 g. of 1 - n - butyl - 6 - amino - 1,2,3,4-tetrahydro-2,4-pyrimidinedione are dissolved in 500 ml. of 10% sodium hydroxide and 125 ml. of ethanol. Operating as in Example 2 one treats first with 180 ml. of dimethyl sulfate, then with 62.5 ml. of sodium hydroxide and finally with 20 ml. of dimethyl sulfate. One obtains 165 g. of the white monohydrate which, after drying, melts at 136-138°.

EXAMPLE 9

*1-n-butyl-3-ethyl-6-amino-1,2,3,4-tetrahydro-2,4-pyrimidinedione*

Proceeding as in Example 3, 108 g. of crude N-ethyl-N'-n-butylurea, which may be prepared by the method of E. M. Schultz (J. Am. Chem. Soc. 69, 1056, 1947), is reacted with 76.5 g. of cyanoacetic acid and 200 ml. of acetic anhydride to obtain 185 g. of syrup consisting largely of N-butyl-N'-ethyl-N'-cyanoacetylurea. 50 g. of this syrup are treated with 50 ml. of water and 10 ml. of 70% sodium hydroxide solution, and 44 g. of crude 1 - n - butyl - 3 - ethyl - 6 - amino - 1,2,3,4-tetrahydro - 2,4 - pyrimidinedione are obtained. The latter is twice recrystallized by dissolving in 5 parts of ethyl acetate and adding 4 parts of petroleum ether. 24 g. of the monohydrate is thus obtained as a colorless solid of indefinite crystalline form, melting at 70-72° C.

EXAMPLE 10

*1,3-di-n-butyl-6-amino-1,2,3,4-tetrahydro-2,4-pyrimidinedione*

344 g. of di-n-butylurea are dissolved in 700 ml. of glacial acetic acid and 700 ml. of acetic anhydride, and 224 g. of cyanoacetic acid are added. Operating as in Example 4 one obtains 388 g. of hydrated white crystals, melting at 100-104° C.

EXAMPLE 11

*1-isobutyl-6-amino-1,2,3,4-tetrahydro-2,4-pyrimidinedione*

275 g. of isobutylurea are dissolved in 600 ml. acetic anhydride at 80° C. 275 g. of cyanoacetic acid are added, and after 1.5 hours one cools, adds 1.5 liters of ether, cools again, filters and rinses with ether. To the resultant 255 g. of N-isobutyl-N'-cyanoacetylurea one adds 920 ml. of boiling water and adds at 90° C. and with stirring 175 ml. of 10% sodium hydroxide. The solution is brought to boiling, allowed to cool, acidified to a pH of 5, cooled again, filtered, and the white crystals are washed with water. The yield is 188 g.; the melting point from dilute alcohol is 271-273° C.

EXAMPLE 12

*1-isobutyl-3-methyl-6-amino-1,2,3,4-tetrahydro-2,4-pyrimidinedione*

100 g. of 1-isobutyl-6-amino-1,2,3,4-tetrahydro-2,4-pyrimidinedione are dissolved in 200 ml. of 10% sodium hydroxide at 50° C. and, operating as in Example 2, one treats with 665 ml. dimethyl sulfate, then with 100 ml. 10% sodium hydroxide and finally with 5 ml. dimethyl sulfate. The solution is stirred for an additional half hour, neutralized with 10% sodium hydroxide, cooled, filtered and the precipitate washed and recrystallized with charcoal and a filter aid from 1 liter of water. 80 g. of the monohydrate of melting point 120° C. are obtained. Drying for 24 hours at 70° C. yields the anhydrous product, which melts at 173-175° C.

EXAMPLE 13

*1-hexyl-3-ethyl-6-amino-1,2,3,4-tetrahydro-2,4-pyrimidinedione*

To an ice-cooled solution of 71 g. of ethyl isocyanate in 300 ml. of benzene is added, with stirring, a solution of 90 g. of hexylamine in 200 ml. of benzene. One cools to control the reaction and, upon its completion, evaporates the solvent by vacuum distillation.

123 g. of N-n-hexyl-N'-ethylurea, 250 ml. of acetic anhydride, 80 g. of glacial acetic acid and 80 g. of cyanoacetic acid are heated for 2 hours at 55-65° C. Vacuum distillation removes most of the solvent. One then adds 150 ml. of water and resumes the vacuum distillation until almost all of the solvent has disappeared. Enough 10% sodium hydroxide is added to make the solution alkaline to phenolphthalein. One warms to 70° C., and the temperature is maintained for 5 minutes at 70-80° C. Upon cooling a waxy material is obtained, which on washing with water and repeated recrystallization from ethanol yields 1-hexyl-3-ethyl-6-amino-1,2,3,4-tetrahydro-2,4-pyrimidinedione. The white crystals melt at 161-163° C.

EXAMPLE 14

*1-cyclohexyl-3-ethyl-6-amino-1,2,3,4-tetrahydro-2,4-pyrimidinedione*

To an ice-cooled solution of 142 g. of ethyl isocyanate in 400 ml. of benzene is gradually added, with stirring, a solution of 188 g. of cyclohexylamine in 300 ml. of benzene, the temperature being held below 30° C. Partial crystallization occurs during the reaction. The mixture is transferred to a large dish and the solvent evaporated on a steam bath. The colorless, crystalline residue, consisting of practically pure N-cyclohexyl-N'-ethylurea weighs 316 g. Recrystallization from 10 parts of ethyl acetate gives needles melting at 113-115° C.

A mixture of 316 g. of N-ethyl-N'-cyclohexylurea, 190 g. cyanoacetic acid and 600 ml. of acetic anhydride is heated for 3 hours on a water bath held at about 90° C. The solvent is removed as far as possible by vacuum distillation, the syrup poured into a beaker, covered with 200 ml. of water and stirred. The syrup crystallizes rapidly, the crystals are filtered, washed with water and recrystallized from 8 parts of 50% aqueous ethanol, using charcoal to decolorize. A second recrystallization from the same solvent gives 300 g. of pure N-cyclohexyl-N'-ethyl-N'-cyanoacetylurea, as rectangular plates, melting at 110-112° C. A mixed melting point with the starting material, N-cyclohexyl-N'-ethylurea, gives a depressed melting point of about 90-95° C., showing the non-identity of the two products. 100 g. of this crystalline N-cyclohexyl-N'-ethyl-N'-cyanoacetylurea in 150 ml. of water are reacted with 25 ml. of a 70% aqueous solution of sodium hydroxide. Proceeding as in Example 3, a 30% yield of 1-cyclohexyl-3-ethyl-6-amino-1,2,3,4-tetrahydro-2,4-pyrimidinedione is obtained.

EXAMPLE 15

*1-benzyl-6-amino-1,2,3,4-tetrahydro-2,4-pyrimidinedione*

40 g. of benzylurea are dissolved in 70 ml. of glacial acetic acid and 70 ml. of acetic anhydride. 27 g. of cyanoacetic acid are added and the mixture is heated for 2 hours at 70° C. While the solvent is distilled off under vacuum, precipitation begins. After filtration, the crude N-benzyl-N'-cyanoacetylurea is ground with water, stirred and heated with 25 ml. of 10% sodium hydroxide solution. Enough 70% sodium hydroxide is added to neutralize. The mixture is then boiled and stirred, 10 ml. of 10% sodium hydroxide solution is added and boiling continued for 10 minutes. After neutralizing with acetic acid and cooling one filters and washes with water. Upon recrystallization from 3200 ml. of 50% ethanol, 16 g. of pure 1-benzyl-6-amino-1,2,3,4-tetrahydro-2,4-pyrimidinedione is obtained which melts at 285-286° C.

EXAMPLE 16

*1,3-dibenzyl-6-amino-1,2,3,4-tetrahydro-2,4-pyrimidinedione*

290 g. of dibenzylurea are dissolved in 350 ml. glacial acetic acid and 350 ml. of acetic anhydride. 120 g. cyanoacetic acid are added and the mixture kept at 60-65° C. for 2 hours. The solvent is evaporated in vacuum on the steam bath. After removal of about 500 ml. of solvent, the crystallization starts. One half volume of 95% ethanol and one half volume of 10% sodium hydroxide are added. The solution is then made alkaline to phenolphthalein by adding 70% sodium hydroxide solution. On stirring, 350 g. of the crude monohydrate of 1,3-dibenzyl-6-amino - 1,2,3,4 - tetrahydro - 2,4 - pyrimindinedione precipitates. Recrystallization from 60% ethanol yields white crystals which melt at 120-125° C.

EXAMPLE 17

*1-(γ-phenylpropyl)-3-ethyl-6-amino-1,2,3,4-tetrahydro-2,4-pyrimidinedione*

To 121 g. of ethyl isocyanate in 300 ml. of benzene are added, with cooling, 217 g. of γ-phenylpropylamine in 200 ml. benzene. Proceeding as in Example 3, the N-(γ-phenylpropyl)-N'-ethylurea is obtained. 250 g. of this urea derivative are treated with 500 ml. of acetic anhydride, 70 ml. of glacial acetic acid and 136 g. of cyanoacetic acid. By the method described in Example 13, 1 - (γ - phenylpropyl) - 3 - ethyl-6 - amino - 1,2,3,4 - tetrahydro - 2,4-pyrimidinedione is obtained, which may be purified by dissolving in ethyl acetate and precipitating with absolute ether. The white crystals melt at 141-143° C.

EXAMPLE 18

*1-methyl-3-n-propyl-6-amino-1,2,3,4-tetrahydro-2,4-pyrimidinedione*

135 g. of 1-methyl-6-amino-1,2,3,4-tetrahydro-2,4-pyrimidinedione is treated with 264 ml. of a 16% aqueous solution of sodium hydroxide. Some of the resultant sodium salt precipitates. 480 ml. of 95% ethanol and 204 g. of n-propyl iodide are added and the mixture stirred and heated to reflux temperature for 2 hours. The sodium salt dissolves and reacts during that time. On cooling, a small amount of the unreacted pyrimidinedione derivative may precipitate. It is removed by filtration and the alcohol and unreacted propyl iodide are evaporated on the steam bath. On cooling, the 1-methyl-3-propyl-6-amino - 1,2,3,4-tetrahydro - 2,4 - pyrimidinedione precipitates. It is recrystallized from hot water containing a small amount of sodium hydroxide to remove any remaining starting material. Heating at 80° C. for 12 hours yields anhydrous crystals melting at 160-161° C.

EXAMPLE 19

*1-ethyl-3-n-propyl-6-amino-1,2,3,4-tetrahydro-2,4-pyrimidinedione*

100 g. of 1-ethyl-6-amino-1,2,3,4-tetrahydro-2,4-pyrimidinedione is treated with 170 ml. of a 16% aqueous solution of sodium hydroxide, 325 ml. of 95% ethanol and 137 g. of n-propyl iodide as in Example 18. In this case, the sodium salt does not precipitate. The hydrate of 1-ethyl-3-n - propyl - 6-amino - 1,2,3,4 - tetrahydro - 2,4 - pyrimidinedione is dried by stirring with anhydrous ether. The resulting crystals melt at 145-147° C.

We claim:
1. New chemical compounds of the structure

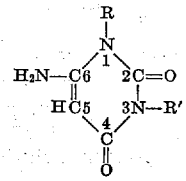

wherein the substituent radicals R and R' represent a member of the group consisting of alkyl, cycloalkyl and aralkyl radicals and wherein one of these substituent radicals R and R' contains a minimum of three carbon atoms.

2. A 1,3 - dialkyl - 6 - amino - 1,2,3,4 - tetrahydro-2,4-pyrimidinedione of the structure

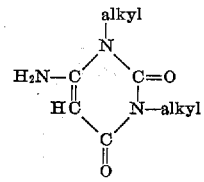

wherein at least one of the alkyl groups contains a minimum of three carbon atoms.

3. A 1,3 - dialkyl - 6 - amino - 1,2,3,4 - tetrahydro-2,4-pyrimidinedione, in which the alkyl group in the 1-position contains three carbon atoms.

4. A 1 - (n - propyl) - 3 - alkyl - 6 - amino - 1,2,3,4-tetrahydro-2,4-pyrimidinedione.

5. New chemical compounds of the general structure

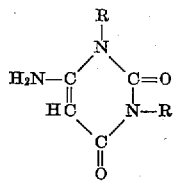

wherein one of the substituent R groups is an alkyl radical and the other an aralkyl radical.

6. A 1 - cycloalkyl - 3 - alkyl - 6 - amino - 1,2,3,4-tetrahydro-2,4-pyrimidinedione.

7. A 1 - cyclohexyl - 3 - alkyl - 6 - amino - 1,2,3,4-tetrahydro-2,4-pyrimidinedione.

8. A 1,3 - diaralkyl - 6 - amino - 1,2,3,4 -tetrahydro-2,4-pyrimidinedione of the structure

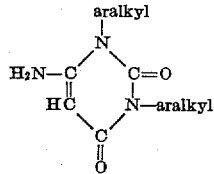

9. A 1 aralkyl - 3 - benzyl - 6 - amino - 1,2,3,4 - tetrahydro-2,4-pyrimidinedione.

10. 1,3 - dibenzyl - 6 - amino - 1,2,3,4 - tetrahydro-2,4-pyrimidinedione.

11. A 1,3 - dialkyl - 6 - amino - 1,2,3,4 - tetrahydro-2,4-pyrimidinedione of the structure

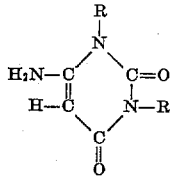

wherein one R is a propyl radical and the other R is an ethyl radical.

VIKTOR PAPESCH.
ELMER F. SCHROEDER.

REFERENCES CITED

The following references are of record in the file of this patent:

Beilstein: Handbuch der Organischen Chemie, vol. 24, p. 472.

Certificate of Correction

Patent No. 2,567,651 September 11, 1951

VIKTOR PAPESCH ET AL

It is hereby certified that error appears in the printed specification of the above numbered patent requiring correction as follows:

Column 1, line 2, for "substitute" read *substituted*; column 2, line 20, for that part of the equation reading "H—NH" read *R—NH*; column 10, line 13, for "1 aralkyl" read *1-aralkyl*;

and that the said Letters Patent should be read as corrected above, so that the same may conform to the record of the case in the Patent Office.

Signed and sealed this 25th day of December, A. D. 1951.

[SEAL]

THOMAS F. MURPHY,
*Assistant Commissioner of Patents.*